(12) United States Patent
Atkinson

(10) Patent No.: US 11,175,722 B2
(45) Date of Patent: Nov. 16, 2021

(54) COMPUTING DEVICE POWER MANAGEMENT

(71) Applicant: HEWLETT-PACKARD DEVELOPMENT COMPANY, L.P., Houston, TX (US)

(72) Inventor: Lee Atkinson, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 680 days.

(21) Appl. No.: 16/075,759

(22) PCT Filed: Apr. 20, 2017

(86) PCT No.: PCT/US2017/028625
§ 371 (c)(1),
(2) Date: Aug. 6, 2018

(87) PCT Pub. No.: WO2018/194620
PCT Pub. Date: Oct. 25, 2018

(65) Prior Publication Data
US 2021/0208666 A1     Jul. 8, 2021

(51) Int. Cl.
*G06F 1/3287* (2019.01)
*G06F 1/26* (2006.01)
*G06F 1/3206* (2019.01)
*G06F 13/40* (2006.01)

(52) U.S. Cl.
CPC ............ *G06F 1/3287* (2013.01); *G06F 1/266* (2013.01); *G06F 1/3206* (2013.01); *G06F 13/40* (2013.01)

(58) Field of Classification Search
CPC .......... G06F 1/325; G06F 1/3287; G06F 1/32; G06F 1/266; G06F 1/3206; G06F 13/40
See application file for complete search history.

(56) References Cited

U.S. PATENT DOCUMENTS

| | | | |
|---|---|---|---|
| 8,018,699 B2 | 9/2011 | Smith et al. | |
| 2005/0272402 A1* | 12/2005 | Ferentz | H04L 12/10 455/402 |
| 2010/0073837 A1 | 3/2010 | Predtetchenski et al. | |
| 2011/0016333 A1 | 1/2011 | Scott et al. | |
| 2014/0129856 A1* | 5/2014 | Bertin | G06F 1/266 713/320 |
| 2014/0195826 A1 | 7/2014 | Wojcik et al. | |

(Continued)

FOREIGN PATENT DOCUMENTS

WO     WO-2005109154     11/2005

OTHER PUBLICATIONS

"Adaptive Digital DC-DC Controller with Drivers and Current Sharing", Intersil Americas Inc., Dec. 15, 2010, 45 pages.
(Continued)

*Primary Examiner* — Paul Yen
(74) *Attorney, Agent, or Firm* — Michael A Dryja

(57) ABSTRACT

A computing device includes a power circuit to provide up to a maximum amount of power. The computing device includes internal hardware having an actual current usage power, and ports that are each connectable to a peripheral device having an actual current port usage power. The computing device includes power manager hardware. Responsive to an overpower condition at the power circuit, the computing device is to disconnect a selected port from the power circuit.

15 Claims, 3 Drawing Sheets

(56) References Cited

U.S. PATENT DOCUMENTS

| | | |
|---|---|---|
| 2015/0160674 A1 | 6/2015 | Burdette et al. |
| 2015/0323979 A1* | 11/2015 | Kaestner ................. G06F 1/266 |
| | | 713/323 |
| 2016/0179164 A1 | 6/2016 | Park et al. |
| 2016/0190794 A1 | 6/2016 | Forghani-zadeh et al. |
| 2016/0226483 A1* | 8/2016 | Chen ......................... G06F 1/26 |
| 2017/0005495 A1 | 1/2017 | Yang et al. |

OTHER PUBLICATIONS

"Using USB Devices (Overview)", System Administration Guide: Devices and File Systems, Oracle, Retrieved from Internet: http://docs.oracle.com/cd/E19120-01/open.solaris/819-2723/devusbover-24/index.html, 2017, 10 Pages.

\* cited by examiner

COMPUTING DEVICE POWER MANAGEMENT

BACKGROUND

Computing devices include desktop computers as well as portable computers like laptop and notebook computers. A computing device includes internal hardware, such as processors, memory, and storage devices, as well as display devices in the case of portable computers and all-in-one (AIO) desktop computers. A computing device can also have ports, such as universal serial bus (USB) ports, to which peripheral devices like storage devices, input devices such as keyboards and pointing devices, and output devices such as printers can be connected.

DETAILED DESCRIPTION

Figure 1:
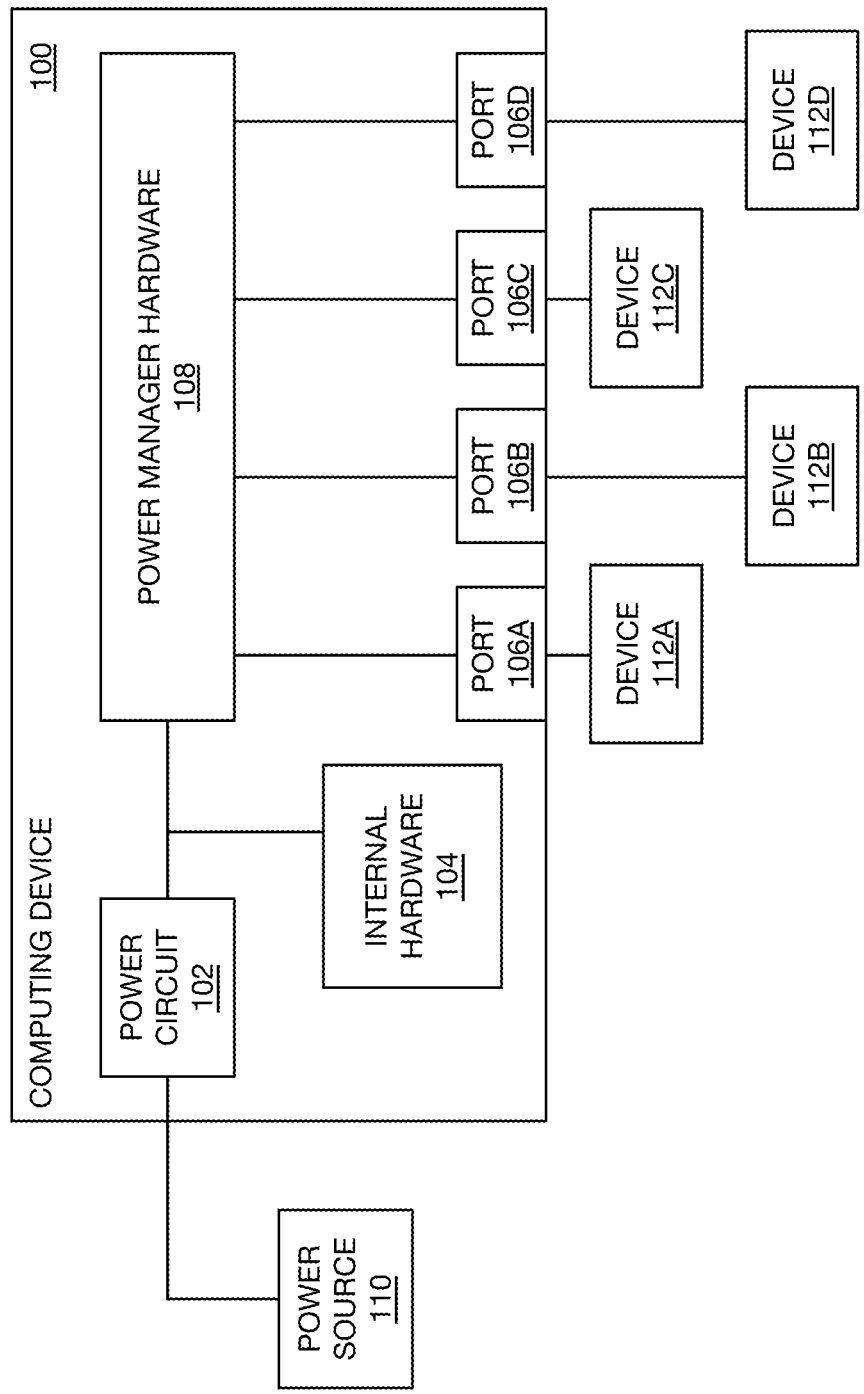
FIG. 1 is a diagram of an example computing device.

As noted in the background section, a computing device like a desktop, laptop, or notebook computer can include internal hardware and ports to which peripheral devices, or external components, can be connected. A computing device can be connected to a power source like a wall outlet, which provides power to the internal hardware of the computer, including indirectly via recharging of a battery of the computing device. External components connected to the ports of a computing device may also receive power at these ports, in addition to communicating data with the computing device over the ports. Such external components can be referred to as bus-powered components.

A computing device includes a power circuit, which can include an internal power supply. The power circuit manages delivery of power from an external power source or an internal battery to the internal hardware of a computing device and to external components connected to the ports of the computing device. A power circuit can in sum provide a maximum amount of power, which may be measurable in watts or amps, where the latter is more specifically a measure of current. To ensure that the power circuit does not fail catastrophically or otherwise, power manager hardware (i.e., circuitry) of a computing device can monitor power usage of the internal hardware and the power consumed by external components connected to the ports of the computing device.

Conventionally, the internal hardware of a computing device in total can have a maximum power budget, and each port can have an individual power budget. For example, the power supply of a computing device may be able to provide eighty watts of total direct current (DC) power. The computing device's internal hardware, including memory, processors, storage devices, and a display device, may be specified so that they maximally consume in total no more than thirty watts of DC power. The computing device may have four ports, three of which that are specified as being able to provide up to ten watts of DC power, and the fourth of which that is specified as being able to provide up to twenty watts of DC power. The power manager hardware may monitor power usage so that no external component connected to a port exceeds the port's rating of ten or twenty watts, and/or so that the total power usage by the internal hardware and the connected external components does not exceed eighty watts.

Specifying maximum power usage on a per-port basis has shortcomings, however. Many external components, such as input devices like keyboards and pointing devices, and non-bus-powered devices (i.e., components that have their own built-in batteries or that are themselves connected to a wall outlet), use significantly less than ten watts of power, and may use as little as a half watt of power. Even relatively high-power external components like larger bus-powered storage devices that may at peak times use twenty watts of power may on average use significantly less than this amount, including less than ten watts of power. Similarly, the internal hardware of a computing device consumes its total peak rating infrequently. As such, the power supply of a computing device has a maximum capacity that is greater than necessary the vast majority of the time, necessitating a larger, heavier, and more expensive power supply.

Furthermore, specifying maximum power usage on a per-port basis unnecessarily limits the usefulness of the ports. For instance, in the aforementioned example, a user may wish to connect two storage devices that each may consume up to twenty watts of power to corresponding ports of the computing device. The user may also have already connected a mouse and a keyboard that each consume a half watt of power. Although the maximum theoretical total power usage of these four devices—forty-one watts—is less than the power that the ports in total can provide, which is fifty watts, the user could not connect both storage devices to the computing device. This is because the computing device has just one port rated for twenty watts; the other three ports do not each provide more than ten watts of power.

As another example, a user may wish to connect three storage devices that each may consume up to twenty watts of power to corresponding ports of the computing device. The total maximum amount of power consumed by the storage devices at any given time is thus theoretically sixty watts. Adding this amount to the total theoretical maximum amount of power consumed by the internal hardware of the computing device—thirty watts—yields ninety watts, which is greater than the computing device's power supply, which is rated at eighty watts, can provide. However, in actuality, the likelihood that the total power used by the storage devices and the internal hardware at any given time will exceed the eighty-watt rating of the power supply is low if not remote. In both these examples, the user is thus effectively artificially limited in the types of devices he or she can connect to the ports of the computing device.

Disclosed herein are power management techniques that can alleviate the shortcomings described above. A power circuit of a computing device can provide up to a maximum amount of power. Internal hardware of the computing device has an actual current usage power, and ports of the computing device are each connectable to a peripheral device that has an actual current port usage power. Power manager hardware of the computing device can monitor the power that the power circuit is currently providing. When the power manager hardware detects an overpower condition at the power circuit, it selects one of the ports and disconnects the selected port from the power circuit, so that the peripheral device connected to the selected port is no longer provided power by the computing device's power circuit. As such, the overpower condition at the power circuit can be alleviated.

The overpower condition at the power circuit can be an overcurrent or undervoltage condition. An overcurrent condition occurs when the power circuit is providing more current than that at which the power circuit is rated. An undervoltage condition can co-occur with an overcurrent condition, and results when the voltage at the power circuit is sagging below its rated voltage, such as due to too much current being drawn from the power circuit. The actual current usage power of the internal hardware of the computing device and the actual current port usage power at each port can cause an overpower condition at the power circuit. For instance, when the power circuit is currently providing more than a threshold percentage of the maximum amount of power to the internal hardware and at the ports, an overpower condition can result. As such, when the sum of the actual current usage power of the internal hardware and the actual current port usage power at each port exceeds the maximum amount of power that the power circuit can provide, an overpower condition occurs.

The power manager hardware thus monitors the total current power usage of the computing device, regardless of whether that power is being consumed by internal hardware of the computing device or by peripheral devices connected to the computing device's ports. This means that each port can be rated as providing the same maximum usage individual port power to provide to a connected peripheral device. The sum of the maximum usage power that the internal hardware may use and the product of the maximum usage individual port power multiplied by the total number of ports can thus exceed the maximum amount of power that the power circuit can provide. Similarly, the product of the maximum usage individual port power multiplied by the number of ports may exceed the maximum usage total power that the ports in total can provide.

For example, there may be four ports that in total can provide seventy watts of DC power. However, each port may be individually rated at twenty watts of DC power, and inform a peripheral device connected thereto that the port can provide twenty watts, even though the product of twenty watts times four ports is greater than the maximum fifty watts that the ports together can provide at any one time. Furthermore, the internal hardware may use up to thirty watts of DC power, and the power circuit rated at eighty watts of DC power. If peripheral devices that each use twenty watts of power at the same time are connected to all four ports, the power circuit's maximum rating will have already been met. Even if peripheral devices that each use twenty watts of power at the same time are connected to just three ports, the power circuit's maximum rating of eighty watts will still leave just twenty watts for the internal hardware, even though the internal hardware may use up to thirty watts.

The techniques disclosed herein therefore leverage the insight that at any given time, the likelihood that the total current power usage of the peripheral devices connected to the computing device's ports plus the current power usage of the computing device's internal hardware will exceed the maximum amount of power that the power circuit can provide is low. Therefore, the techniques disclosed herein may not limit power on a per-port basis, or even on an all-ports basis. For example, if a type of port is limited to twenty watts, and there are four ports, each port may advertise to a connected peripheral device that it can provide twenty watts, and there may be no power limiting that occurs over the four ports in total (i.e., as less than eighty watts).

Rather, the techniques disclosed herein manage power on a computing device-wide basis. In the infrequent if not rare cases in which the internal hardware combined with the peripheral devices connected to the computing device's ports are using more power than the power circuit can provide, just then may the power manager hardware disconnect a port (and thus a peripheral device) from the power circuit to ensure that the power circuit does not experience catastrophic or other failure. Different prioritization strategies, as described in detail below, can further be employed to select the port to which to disconnect from the power circuit to ensure that the power draw on the power circuit stays within the power circuit's specified rating.

FIG. 1 shows an example computing device 100. The computing device 100 may be a computer, like a desktop computer, or a portable computer such as a laptop or notebook computer. Other examples of a computing device 100 include a docking station, a display device, and a data hub. The computing device 100 includes a power circuit 102, internal hardware 104, ports 106A, 106B, 106C, and 106D, and power manager hardware 108. The computing device 100 can include other hardware, in addition to those depicted in FIG. 1.

The power circuit 102 provides a maximum amount of power. The power circuit 102 can be connected to a power source 110 external to the computing device 100, such as an alternating current (AC) power source like an AC mains wall outlet, a surge protector connected to such a wall outlet, a uninterruptible power supply (UPS) connected to such a wall outlet, and so on. The power circuit 102 can include a power supply, which may be internal or external to a case or housing of the computing device 100, and which includes a transformer to convert the AC power provided by the power source 110 to DC power used by the computing device 100. The power circuit 102 can include a battery that is recharged by the power supply, so that the computing device 100 is usable when the power circuit 102 is not connected to the power source 110.

The internal hardware 104 includes hardware components of the computing device 100 that are permanently or removably attached or disposed within the case or housing of the computing device 100. Such hardware components can include processors, memory, storage devices like hard disk drives (HDDs) and solid-state drives (SSDs), and so on. If the computing device 100 is an all-in-one (AIO) or portable computing device, the hardware components may include a display device, like a liquid crystal display (LCD). The internal hardware 104 is powered via the power circuit 102. The internal hardware 104 has a rated maximum usage power, and an actual current usage power. That is, at any given time, the internal hardware 104 instantaneously consumes an actual current usage power, which is no more than the rated maximum usage power.

The ports 106A, 106B, 106C, and 106D are collectively referred to as the ports 106, and the nomenclature "port 106" refers to any one of the ports 106. In the example of FIG. 1, the computing device 100 has four ports 106, but in general there can be more or fewer ports 106. The ports 106 may be universal serial bus (USB) ports, such as USB 1.0, 2.0, 3.0, 3.1, or USB-C ports. The ports 106 permit external peripheral devices, or external components, 112A, 112B, 112C, and 112D to be physically connected to the computing device 100. The peripheral devices 112 are collectively referred to as the peripheral devices 112, and the nomenclature "peripheral device 112" refers to any one of the peripheral devices 112. Examples of peripheral devices include input devices, such as scanners and user input devices like keyboards and pointing devices (e.g., touchpads, mouses, and trackballs), as well as output devices, such as printers, and storage devices, like external HDDs and SSDs.

Each port 106 has a rated maximum usage individual port power that the port 106 can provide to a peripheral device 112 connected thereto. The ports 106 may each have the same rated maximum usage individual port power. For example USB 3.0 ports may each provide a maximum of 1.5 amps, or 7.5 watts at five volts, whereas USB 3.1 ports may each provide a maximum of three amps, or fifteen watts at five volts. Each port 106 has an actual current port power usage, which is the amount of power that the peripheral device 112 connected to the port 106 in question is instantaneously consuming, and which is no greater than the maximum usage individual port power of the port 106. The power circuit 102 provides the power that is provided at each port 106. A peripheral device 112 connected to a port 106 may use at least a minimum amount of power that the port 106 can provide. If the peripheral device 112 is bus-powered—i.e., the device 112 is itself not connected to the power source 110 or does not have a battery—then the device 112 is completely powered by the power that it receives from the power circuit 102 through the port 106 in question.

The power manager hardware 108 monitors the power that the power circuit 102 is currently providing to the internal hardware 104 and any peripheral devices 112 connected to the ports 106. Stated another way, the power manager hardware 108 can monitor the power draw against the power circuit 102. The power manager hardware 108 may monitor the power that the power circuit 102 is currently providing in a number of different ways. The power manager hardware 108 may measure or otherwise detect the amount of power currently being drawn from the power circuit 102, such as in watts. The power manager hardware 108 may monitor the power circuit 102 for an overcurrent condition, which is when more current is being drawn from the circuit 102 than the circuit 102 can provide. The power manager hardware 108 may monitor the power circuit 102 for an undervoltage condition, which is a sagging voltage at the circuit 102 that occurs when too much power is being drawn from the power circuit 102.

The power manager hardware 108 monitors the power circuit 102 to detect the occurrence of an overpower condition. An overpower condition occurs as a result of an overcurrent or undervoltage condition. An overpower condition can occur when the power circuit 102 is providing an amount of power to the internal hardware 104 and at the ports 106 (i.e., to the peripheral devices 112 connected thereto) greater than a threshold percentage of the maximum amount of power that the circuit 102 can provide. Thus, when the actual current usage power of the internal hardware 104, plus the actual current port usage power of the peripheral device 112 connected to each port 106, is greater than the maximum amount of power that the power circuit 102 can provide, an overpower condition results.

In this respect, the sum of the rated maximum usage power of the internal hardware 104 and the rated maximum usage individual port power provided by each port 106 can exceed the maximum amount of power that the power circuit 102 can provide. As noted above, the likelihood of this scenario occurring is low if not rare, and permitting each port 106 to provide the same maximum usage individual port power provides the user of the computing device 100 with greater flexibility in connecting peripheral devices 112 to the ports 106. For instance, rather than having one USB 3.0 port that can provide 1.5 amps and the other USB 3.0 ports limited to providing 0.9 amps, all the USB 3.0 ports can each be rated as providing a maximum of 1.5 amps. Furthermore, the power supply of the power circuit 102 can be sized to provide a lower amount of maximum power, which can reduce cost, weight, utilized physical space, and/or generated heat of the computing device 100.

However, although the likelihood that an overpower condition occurring at the power circuit 102 is low if not rare, it is not zero. Therefore, when the power manager hardware 108 detects an overpower condition at the power circuit 102, the amount of power drawn from the power circuit 102 has to be reduced to avoid failure of the power circuit 102 and/or of the computing device 100 as a whole, catastrophic or otherwise. As such, responsive to an overpower condition occurring, the power manager hardware 108 selects one of the ports 106 to which a peripheral device 112 is connected, and disconnects the selected port 106 from the power circuit 102. For instance, when the sum of the actual current usage power of the internal hardware 104 and the actual current port usage power of the peripheral device 112 connected to each port 106 is greater than the maximum amount of power that the power circuit 102 can provide, the power manager hardware 108 disconnects a selected port 106 from the power circuit 102.

The resulting decrease in power currently being provided by the power circuit 102 should alleviate the overpower condition, so that the internal hardware 104 can continue to properly function (via receipt of power), as can the peripheral devices 112 that remain connected to powered ports 106. Furthermore, catastrophic or other failure of the power circuit 102 is avoided. If the overpower condition still exists, the power manager hardware 108 may select another port 106 to disconnect from the power circuit 102 to alleviate the overpower condition. Different strategies for selecting a port 106 to disconnect from the power circuit 102 to alleviate an overpower condition at the power circuit 102 are described in more detail below.

Figure 2:
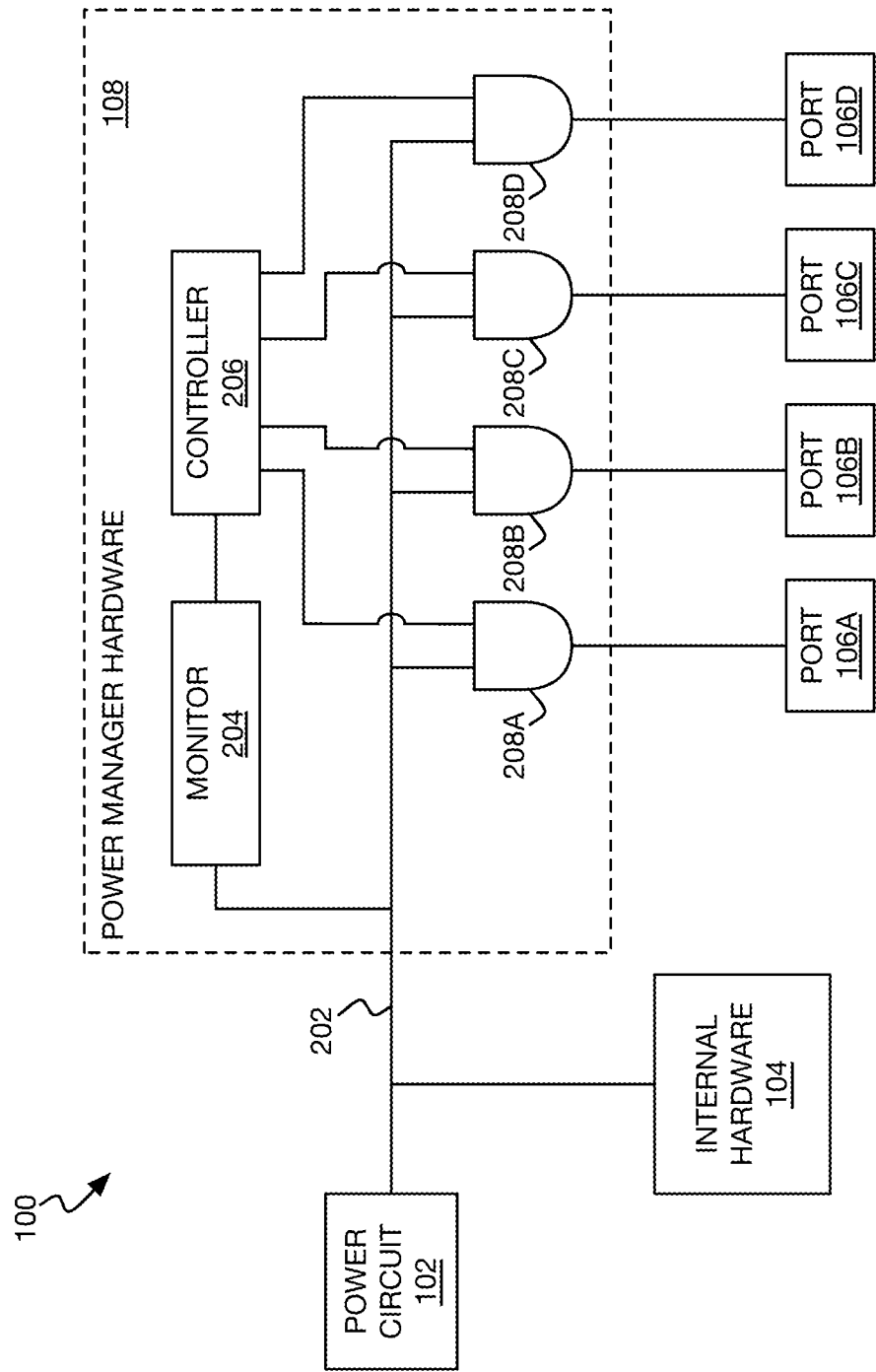
FIG. 2 is a diagram of the example computing device of FIG. 1 in which power manager hardware of the computing device is depicted in detail.

FIG. 2 shows the example computing device 100 in which the power manager hardware 108 is shown in more detail. The power source 110 and the peripheral devices 112 are not depicted in FIG. 2 for illustrative clarity and convenience. A shared voltage or power line 202 extends from the power circuit 102 to the internal hardware 104, as well as through the power manager hardware 108 to the ports 106. The power circuit 102 thus provides power to the internal hardware 104 and at the ports 106 via the shared power line 202.

The power manager hardware 108 includes a monitor 204 and a controller 206 that is connected to the monitor 204. Each of the monitor 204 and the controller 206 may be implemented via circuitry, including one or more integrated circuits (ICs). The monitor 204 monitors the shared power line 202 to detect whether an overpower condition is occurring at the power circuit 102. The monitor 204 can output a signal to the controller 206 corresponding to whether or not an overpower condition has been detected at the power circuit 102.

The power manager hardware 108 can include logical AND gates 208A, 208B, 208C, and 208D, which are collectively referred to as the AND gates 208, and where the nomenclature "AND gate 208" refers to any of the AND gates 208. The AND gates 208 correspond in number and individually to the ports 106; each AND gate 208 has an output connected to a corresponding port 106. One input of each AND gate 208 is connected to the shared power line 202. The other input of each AND gate 208 is connected to the controller 206. When the monitor 204 does not report detection of an overpower condition at the power circuit 102, the controller 206 raises its input of each AND gate 208 high. This permits each port 106 to receive the power provided by the power circuit 102 on the shared power line 202 at the other input of the AND gate 208 corresponding to the port 106 in question.

However, when the monitor 204 detects an overpower condition and reports the detection of the overpower condition to the controller 206, the controller 206 selects one of the ports 106 to disconnect from the shared power line 202 and thus from the power circuit 102. The controller 206 correspondingly lowers the input of the AND gate 208 connected to the selected port 106, which prevents the selected port 106 from receiving power from the power circuit 102 over the shared power line 202. If the monitor 204 continues to detect an overpower condition, then the controller 206 may select another port 106 to disconnect from the power circuit 102, and so on, until the overpower condition is alleviated. It is also noted that in one implementation, the monitor 204 may be connected to the output of each AND gate 208, so that the monitor 204 is able to monitor the power usage at each port 106 in addition to the total power that the power circuit 102 is currently providing to the internal hardware 104 and at the ports 106.

Responsive to the monitor 204 detecting an overpower condition at the power circuit 102, the controller 206 can select a port 106 to disconnect from the shared power line 202 in a number of different ways. The controller 206 may select the port 106 randomly from the ports 106 to which peripheral devices 112 are connected. The controller 206 may select the port 106 to which a peripheral device 112 was most recently and is still connected, in a last-connected, first-disconnected methodology. The latter strategy may be useful because a user may expect selection of this port 106 from power responsive to an overpower condition occurring.

The controller 206 may in one implementation select the port 106 to which a peripheral device 112 is connected that is currently using the most power. This strategy can be useful to ensure that a minimum number of ports 106 have to be disconnected from the shared power line 202 to alleviate the overpower condition at the power circuit 102. That is, selecting the port 106 that is currently providing the most power is more likely to relieve the overpower condition than selecting a port 106 that is providing a minimal amount of power to its connected peripheral device 112, which may then necessitate the disconnection of another port 106 (or more) from power to alleviate the overpower condition at the power circuit 102.

In one implementation, the controller 206 may select the port 106 to which a peripheral device 112 is connected that is consuming more power than the amount that the port 106 advertised as available to the device 112. For instance, when a peripheral device 112 is first connected to a port 106, the port 106 may communicate the amount of power that the device 112 is permitted to use, such as twenty watts in one example. However, in accordance with the techniques described herein, the peripheral device 112 is permitted consume more than this advertised amount of power, which is particularly useful for USB-C and USB-power delivery (USB-PD) ports, so that peripheral devices can more quickly recharge. Except in uncommon if not rare situations, such excessive power consumption is acceptable, because the power circuit 102 has sufficient power to provide the peripheral device 112. But if an overpower condition occurs, the port 106 to which this peripheral device 112 is connected can be selected as the port 106 that is to be disconnected from power.

The controller 206 may in one implementation select a port 106 to which a peripheral device 112 is connected that is just recharging and that is not communicating with the computing device 100 (such as with the operating system running on the device 100). For example, users can employ the computing device 100 to recharge the batteries of external devices in lieu of plugging the devices into dedicated chargers that are connected to a wall outlet or other power source, to avoid having to carry around the chargers. Some external devices are specifically not connected to the data lines or pins of a port, but just connected to the power lines or pins to receive power to recharge their batteries. The controller 206 may thus select a port 106 to which such an external device is connected.

Furthermore, in some cases an external device, such as a smartphone or tablet, may be connected to a port 106 just for battery-recharging purposes even though the device also has the capability to communicate data with the computing device 100. The user may dismount or otherwise logically disconnect the external device within the operating system running on the computing device 100, without actually physically disconnecting the external device from the port 106 to which it is connected. Therefore, the operating system does not permit data communication with the port 106 since from the perspective of the operating system the external device is no longer (logically) connected to the computing device 100. However, the external device is still physically connected to the computing device 100, at a port 106, and thus can be receiving power. Disconnecting an external device that is just recharging and not communicating with the computing device 100 can be useful because it ensures that no computer programs running on the computing device 100 will be adversely affected by disconnecting the corresponding port 106 from power.

In some cases an external device, such as a smartphone or tablet, may be connected to a port 106 for both battery-recharging and data communication purposes. Because the external device has its own internal battery, the port 106 can be selected as the port to disconnect from power, without affecting the data communication between the computing device 100 and the external device. For example, USB and other types of ports can have separate pins for power delivery as opposed to for data communication. As such, the power delivery pins may be disconnected, without disconnecting the data communication pins. Disconnecting such an external device from power can be useful, because although the device is no longer able to be recharged, the external device's ability to communicate data with the computing device 100 can remain unaffected.

The controller 206 in one implementation may select a port 106 from the ports 106 to which peripheral devices 112 are connected that are not user input peripheral devices. This strategy can be useful for at least two reasons. First, user input devices like keyboards and pointing devices are unlikely to consume large amounts of power, such that disconnecting their corresponding ports 106 from power is less likely to alleviate an overpower condition. Second, selecting the ports 106 to which user input devices are connected can result in the user being able to use the computing device 100, particularly when the device 100 is a desktop computer that does not have its own internal keyboard and pointing device.

The controller 206 may in one implementation select a port 106 from the ports 106 to which peripheral devices 112 are connected that are not currently mounted storage devices. When an HDD, SSD, or other external storage device is connected to a port 106 of the computing device 100, the operating system on the computing device 100 may automatically mount the storage device so that data can be stored on and/or retrieved from the storage device. The operating system may not automatically mount the storage device, and instead request that a user confirm whether the device should be mounted, or have the user run a separate computer program to mount the storage device so that the device can be utilized for data storage and retrieval purposes. The operating system can also permit the user to dismount the storage device from the computing device, so that it no longer can be utilized for data storage and retrieval.

However, when an external storage device is connected to a port 106 and is not currently mounted, the storage device remains physically connected to the port 106 and is just logically severed from the operating system running on the computing device. The external storage device can thus still be using power from the power circuit 102 as provided at the port 106. Selecting the port 106 to which such a currently dismounted storage device is physically connected can be desirable because it ensures that no data loss on the storage device will occur when the port 106 is disconnected from power. By comparison, selecting a port 106 to which a currently mounted storage device is connected may result in data loss when the port 106 is disconnected from power, and if the operating system is being executed from the storage device, can result in crashing of the operating system since the operating system can no longer access the storage device.

The controller 206 can in one implementation select a port 106 to disconnect from power to which an external storage device is connected for which write-caching is disabled at the computing device 100 (i.e., at the operating system thereof). Write-caching is a technique that caches data that is to be written to the external storage device, so that from the perspective of the computer programs writing the data, data-writing operations occur more quickly. Periodically the operating system flushes the cache, committing the data to the external storage device. However, when write-caching is enabled, disconnecting the external storage device from the computing device 100, such as by disconnecting the port 106 to which the external storage device is connected from power, can result in data loss. This is because the data may be stored in the cache that has not yet been transferred to the external storage device. Therefore, in this implementation, the controller 206 can select a port 106 to disconnect from power to which an external storage device is connected for which write-caching is not enabled, so that such potential data loss does not occur.

Figure 3:
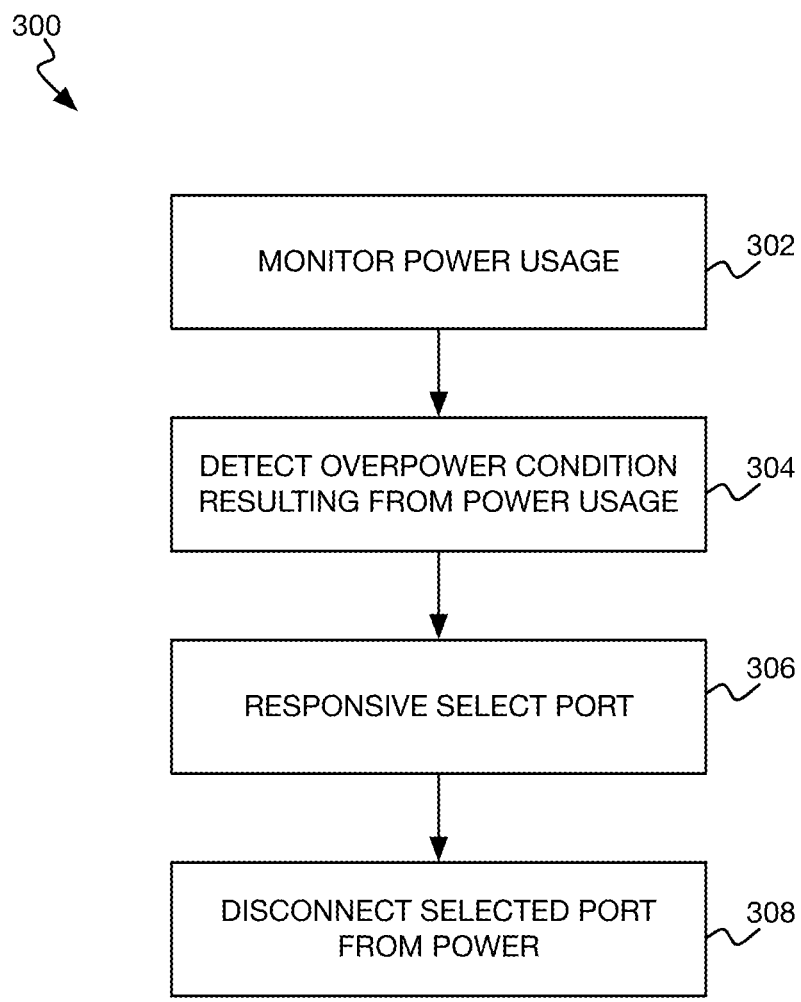
FIG. 3 is a flowchart of a method that power manager hardware of the example computing device of FIG. 1 can perform.

FIG. 3 shows an example method 300 that the power manager hardware 108 of the computing device 100 can perform. The method 300 can be implemented as computer-executable code stored on a non-transitory computer-readable data storage medium that the power manager hardware 108 can perform. For instance, the hardware 108 may be implemented as an application-specific IC (ASIC) or a field-programmable gate array (FPGA) in such an implementation.

The power manager hardware 108 monitors the power that the power circuit 102 is currently providing (302). Stated another way, the power manager hardware 108 powers the power that the internal hardware 104 and the peripheral devices 112 connected to the ports 106 are currently using as provided by the power circuit 102. Such monitoring may be a direct measurement of power, from which an overpower condition can be deduced, or the monitoring may be just monitoring whether an overpower condition such as an overcurrent or undervoltage condition is occurring.

The power manager hardware 108 thus detects an overpower condition resulting from (i.e., caused by) the current power provided by the power circuit 102 that the internal hardware 104 and the peripheral devices 112 are using or consuming (304). Responsive to detecting an overpower condition, the power manager hardware 108 selects a port 106 from the ports 106 to which peripheral devices 112 are currently connected (306). The power manager hardware 108 then disconnects the selected port 106 from the power circuit 102, so that power is no longer provided at this port 106 and thus no longer provided to the peripheral device 112 connected to the port 106 (308), to alleviate the overpower condition.

Techniques have been disclosed for managing the power provided by a power circuit 102 of a computing device 100 to the internal hardware 104 of the device 100 and to peripheral devices 112 connected to ports 106 of the computing device 100. The power management permits each port 106 to effectively advertise a maximum amount of power available at the port 106 that is greater than what can be provided if a peripheral device 112 using the maximum advertised amount were connected to every port 106. However, insofar as this scenario is unlikely if not rare, a user of the computing device 100 is afforded with greater flexibility in using the ports 106 of the computing device 100.

I claim:

1. A computing device comprising:
   a power circuit to provide up to a maximum amount of power;
   internal hardware having an actual current usage power;
   a plurality of ports that are each connectable to a peripheral device having an actual current port usage power; and
   power manager hardware to, responsive to a sum of the actual current usage power of the internal hardware and the actual current port usage power of each peripheral device being greater than the maximum amount of power that the power circuit can provide, resulting in an overpower condition occurring, select and disconnect a port in each of one or more iterations until the overpower condition no longer occurs,
   wherein in each iteration the power manager hardware is to select the port from a group of ports comprising:
      any port other than one of the ports to which a user input peripheral device is connected to permit the user to still be able to provide input to the computing device via the user input peripheral device; and
      any port other than one of the ports to which a mounted data storage device is connected to prevent data loss at the mounted data storage device.

2. The computing device of claim 1, wherein the internal hardware has a maximum usage power,
   and wherein each port has a maximum usage individual port power to provide to the peripheral device connectable thereto.

3. The computing device of claim 2, wherein the maximum amount of power provided by the power circuit is less than a total of the maximum usage power of the internal hardware and the maximum usage individual port power provided by each port.

4. The computing device of claim 2, wherein the ports in total have a maximum usage total port power that the ports provide to the peripheral devices connectable thereto,
   and wherein a sum of the maximum usage individual port power of each port is greater than the maximum usage total port power of the ports in total.

5. The computing device of claim 1, wherein in each of at least one of the iterations the power manager hardware is to select any port other than the one of the ports to which the user input peripheral device is connected to permit the user to still be able to provide input to the computing device via the user input peripheral device.

6. The computing device of claim 1, wherein in each of at least one of the iterations the power manager hardware is to select any port other than the one of the ports to which the mounted data storage device is connected to prevent data loss at the mounted data storage device.

7. The computing device of claim 1, wherein the power circuit is rated to provide up to the maximum amount of power, the internal hardware is specified to consume a maximum usage power, and each port is rated to provide and advertises a maximum power usage power, and wherein a sum of the maximum usage power that the internal hardware is specified to consume and a product of a number of the ports and the maximum port usage power that each port is rated to provide is greater than the maximum amount of power that the power circuit is rated to provide.

8. A method comprising:

monitoring, by power manager hardware of a computing device, an actual current usage power of internal hardware of the computing device and an actual current port usage power of a peripheral device connected to each port of a plurality of ports of the computing device;

detecting, by the power manager hardware, that the actual current usage power of the internal hardware of the computing device and the actual current port usage power at each port are causing an overpower condition at a power circuit of the computing device providing the actual current usage power of the internal hardware and the actual current port usage port at each port;

responsively selecting and disconnecting, by the power manager hardware, a port in each of one or more iterations until the overpower condition no longer occurs, wherein in each iteration the power manager hardware is to select the port from a group of ports comprising:

any port other than one of the ports to which a user input peripheral device is connected to permit the user to still be able to provide input to the computing device via the user input peripheral device; and any port other than one of the ports to which a mounted data storage device is connected to prevent data loss at the mounted data storage device.

9. The method of claim 8, wherein the power circuit provides a maximum amount of power, the overpower condition occurring when the power circuit is currently providing more than a threshold percentage of the maximum amount of power to the internal hardware and at the ports, wherein the internal hardware has a maximum usage power, and each port has a maximum usage individual port power to provide at the port, and wherein the maximum amount of power that the power circuit provides is less than a total of the maximum usage power of the internal hardware and the maximum usage individual port power provided at each port.

10. The method of claim 9, wherein the ports in total have a maximum usage total port power to provide at the ports, and wherein a sum of the maximum usage individual port power provided at each port is greater than the maximum usage total port power provided at the ports.

11. The method of claim 8, wherein in each of at least one of the iterations, any port other than the one of the ports to which the user input peripheral device is connected is selected to permit the user to still be able to provide input to the computing device via the user input peripheral device.

12. The method of claim 8, wherein in each of at least one of the iterations, any port other than the one of the ports to which the mounted data storage device is connected is selected to prevent data loss at the mounted data storage device.

13. A non-transitory computer-readable data storage medium storing computer-executable code that power manager hardware of a computing device executes to:

detect occurrence of an overpower condition at a power circuit of the computing device providing an actual current usage power of internal hardware of the computing device and an actual current port usage power of a peripheral device connected to each port of a plurality of ports of the computing device;

in response to detecting the occurrence of the overpower condition, select and disconnect a port in each of one or more iterations until the overpower condition no longer occurs, wherein in each iteration the power manager hardware is to select the port from a group of ports comprising:

any port other than one of the ports to which a user input peripheral device is connected to permit the user to still be able to provide input to the computing device via the user input peripheral device; and any port other than one of the ports to which a mounted data storage device is connected to prevent data loss at the mounted data storage device.

14. The non-transitory computer-readable data storage medium of claim 13, wherein in each of at least one of the iterations the power manager hardware is to select any port other than the one of the ports to which the user input peripheral device is connected to permit the user to still be able to provide input to the computing device via the user input peripheral device.

15. The non-transitory computer-readable data storage medium of claim 13, wherein in each of at least one of the iterations the power manager hardware is to select any port other than the one of the ports to which the mounted data storage device is connected to prevent data loss at the mounted data storage device.

* * * * *